United States Patent [19]

Tanaka et al.

[11] Patent Number: 5,264,196
[45] Date of Patent: Nov. 23, 1993

[54] MULTICHAMBER TYPE FLUID BED REACTION APPARATUS AND METHOD

[75] Inventors: Hiroshi Tanaka, Ohmiya; Akio Umemura, Urawa, both of Japan

[73] Assignee: Mitsubishi Materials Corporation, Tokyo, Japan

[21] Appl. No.: 892,658

[22] Filed: Jun. 3, 1992

Related U.S. Application Data

[63] Continuation of Ser. No. 683,113, Apr. 8, 1991, abandoned, which is a continuation of Ser. No. 63,330, Jun. 18, 1987, abandoned, which is a continuation-in-part of Ser. No. 787,259, Oct. 15, 1985, abandoned.

[30] Foreign Application Priority Data

Oct. 15, 1984 [JP] Japan .................. 59-215580
Nov. 28, 1984 [JP] Japan .................. 59-251265

[51] Int. Cl.$^5$ .................. C01G 57/00; B01J 8/36
[52] U.S. Cl. .................. 423/258; 422/142; 422/145; 422/147; 423/259; 423/261
[58] Field of Search .................. 422/141–143, 422/145, 147; 423/258–261

[56] References Cited

U.S. PATENT DOCUMENTS

| | | | |
|---|---|---|---|
| 2,395,263 | 2/1946 | Foster | 422/142 X |
| 2,521,195 | 9/1950 | Wheeler | 422/144 |
| 2,529,366 | 11/1950 | Bauer | 422/142 X |
| 2,782,019 | 2/1957 | Turney et al. | 422/142 X |
| 2,907,630 | 10/1959 | Lawroski et al. | 423/258 |
| 2,911,290 | 11/1959 | Jonke et al. | 422/142 |
| 3,869,256 | 4/1975 | Ziegler | 423/258 X |
| 3,941,870 | 3/1976 | Ekstrom et al. | 502/332 X |
| 4,017,422 | 4/1977 | Gappa et al. | 422/142 |
| 4,210,492 | 7/1980 | Roberts | 422/146 X |
| 4,399,106 | 8/1983 | Ueda et al. | 422/140 |
| 4,459,133 | 7/1984 | Moss | 422/142 X |
| 4,462,903 | 7/1984 | Wettengl | 422/141 X |
| 4,517,162 | 5/1985 | Moss | 422/142 |
| 4,925,632 | 5/1990 | Thacker et al. | 422/142 |

OTHER PUBLICATIONS

Fluid-bed Unit Cuts Short Circuits, Chemical Engineering, vol. 63, Feb. 1956, pp. 116–118.

Primary Examiner—James C. Housel
Assistant Examiner—Amalia Santiago
Attorney, Agent, or Firm—James Creighton Wray

[57] ABSTRACT

A multichamber type fluid bed reaction apparatus has a series of chambers formed by dividing the fluid bed part and the wind box part thereof with particular walls. Each reaction chamber is supplied with a reaction gas whose composition, flow amount and temperature can be selected arbitrarily. A fluid bed, a moving bed or a fixed bed may be used in each divided chamber. Regulation of particle formation, gas-particle reaction and amount of particles transferring between the chambers results in an improvement of efficiency and a simplification of the apparatus.

2 Claims, 3 Drawing Sheets

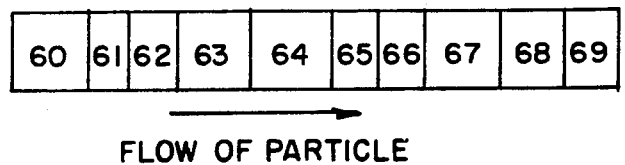
FIG. 5a
FLOW OF PARTICLE
FIG. 5b
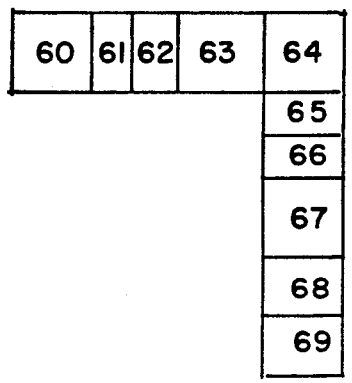
FIG. 5c
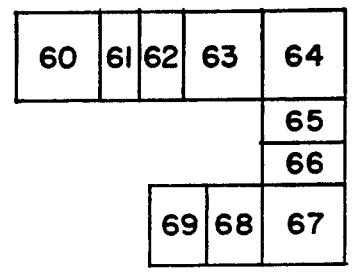
FIG. 7
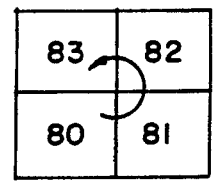
FLOW OF PARTICLE
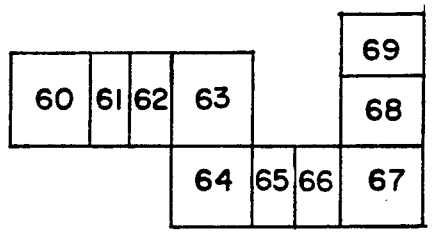
FIG. 5d
FIG. 6
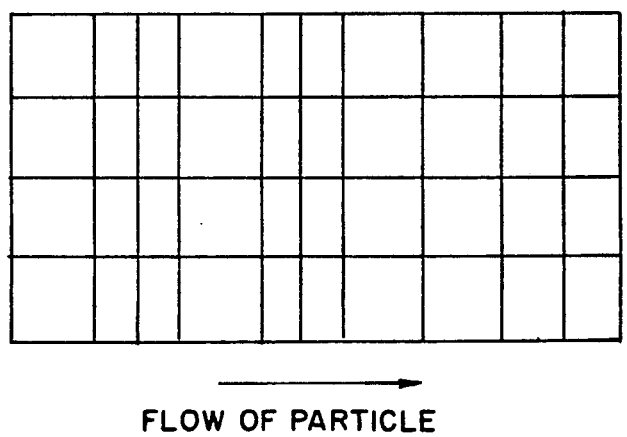
FLOW OF PARTICLE

MULTICHAMBER TYPE FLUID BED REACTION APPARATUS AND METHOD

REFERENCE TO RELATED APPLICATIONS

The present application is a continuation of application Ser. No. 683,113 filed Apr. 8, 1991, abandoned, which is a continuation of application Ser. No. 063,330 filed Jun. 18, 1987, abandoned, which is a continuation in part of application Ser. No. 787,259 filed Oct. 15, 1985, abandoned.

BACKGROUND AND SUMMARY OF THE INVENTION

The present invention relates to a multichamber type fluid bed reaction apparatus whose efficiency can be improved and simplicity can be realized by dividing the fluid bed part and the wind box part into more than two chambers, supplying each divided chamber with reaction gas of which composition, flow amount and temperature can be selected arbitrarily and forming in each divided chamber a fluid bed, a moving bed or a fixed bed with appropriate regulation of reaction in each chamber and transferring of particles between the chambers.

The gas-solid system fluid bed reaction apparatus comprises a fluid bed for fluidizing solid particles with a fluidizing gas and carries out gas-solid reaction by bringing the fluidized particles in contact with a reaction gas. It is widely adapted to general use in the industrial field. However, when several different reactions are carried out continuously using the above said apparatus, it is necessary to multiply the apparatus. In multiplying the apparatus, there are two systems, that is, a multitower system which comprises more than two separate apparatus and the other multichamber system which multiplies the inner part of a single apparatus. The latter has an object of improving its efficiency by multiplying the same reaction, drying and cooling particles (Anonymous: Chem. Eng., 63 116[1956]), but as it does not have a capability of controlling the reaction of particles and the transfer thereof, so it cannot be used for different reactions. On the other hand, the multitower system is generally used for carrying out different reactions by multiplying (C. D. Harrington et al; Uranium Production Technology, D. Van Nostrand Company, Inc. p550–501 [1959]). However, as in the multitower system, when the fluid bed reaction apparatus is multiplied, the chance of transferring particles between towers is increased, and many pipes for transferring particles, pumps for transfer and transfer systems are required. In this case, the arrangement of the apparatus and the operation of the system not only become complex in the design of the apparatus, but also manufacture of the particles and operation of the apparatus, become complicated. In addition, the multitower system is high in cost.

The present inventors have turned their attention to the fact that according to the above mentioned multichamber system, the effect of reactions can be improved even when reactions are identical. They have investigated ways of providing multichamber type fluid bed reaction apparatus which is capable of carrying out different reactions and bringing about improvement of the efficiency of the apparatus and simplification of the operation system by overcoming the above mentioned defects of the conventional multichamber system.

As a result, they have found out that such a multichamber type fluid bed reaction apparatus as mentioned above can be obtained by selecting the proper regulating conditions for reaction of the particles and the amount of transferring particles, and thus they have reached the present invention.

It is an object of the present invention to provide a multichamber type fluid bed reaction apparatus which can improve the efficiency of the apparatus. It is another object of the present invention to provide a multichamber type fluid bed reaction apparatus which involves a simple structure for the apparatus and by simplification of the operating system.

According to the present invention, there is provided a multichamber type fluid bed reaction apparatus comprising more than two chambers formed by dividing said fluid bed part and wind box part thereof with partition walls. Each divided chamber is provided with a gas-particle separator and is supplied with a reaction gas and/or an inert gas of which composition, flow amount and temperature can be selected according to known conditions. A fluid bed, a moving bed or fixed bed may be employed. Regulation of particle formation, gas-particle reaction and amount of transferring particles between said chambers is used.

In the present invention, a step of gas-sealing the reaction gas may be used.

In the present invention, as described above, utilization of different reactions becomes possible by dividing the fluid bed part and the wind box part for supplying a fluidizing gas into a multichamber operating system. The amount of reaction gas, gas temperature, etc. in each chamber is selected according to known conditions. Use of a fluid bed, a moving bed or a fixed bed in each chamber becomes possible by properly selecting the height of the partition wall, using proper regulation of particle reaction and transfer of particles and by regulating the flow amount of the supplying gas. Particles formed can be recovered effectively by attaching a gas-particle separator in each chamber.

The above and further objects and features of the present invention will more fully appear from the following detailed description when the same is read in connection with the attached drawings.

BRIEF DESCRIPTION OF THE ATTACHED DRAWINGS

FIGS. 5(a), (b), (c) and (d) are all schematic plan views of arrangements of the apparatus showing a high degree of freedom of arrangement of the apparatus of the present invention.

FIG. 6 is a schematic plan view of a slab-shaped type fluid bed reaction apparatus which can extend in both the horizontal and vertical directions.

FIG. 7 is a schematic plan view showing a recycle type fluid bed reaction apparatus which recycles particles.

DETAILED DESCRIPTION OF THE INVENTION

Now, the present invention will be explained fully. As an example, the multichamber type apparatus of the present invention will be compared with the conventional multitower system in the case, where uranium oxide is converted into $UF_6$ and, as an example of the reaction apparatus of the present invention, a slab-shaped type multichamber apparatus is used.

Figures 1, 2:
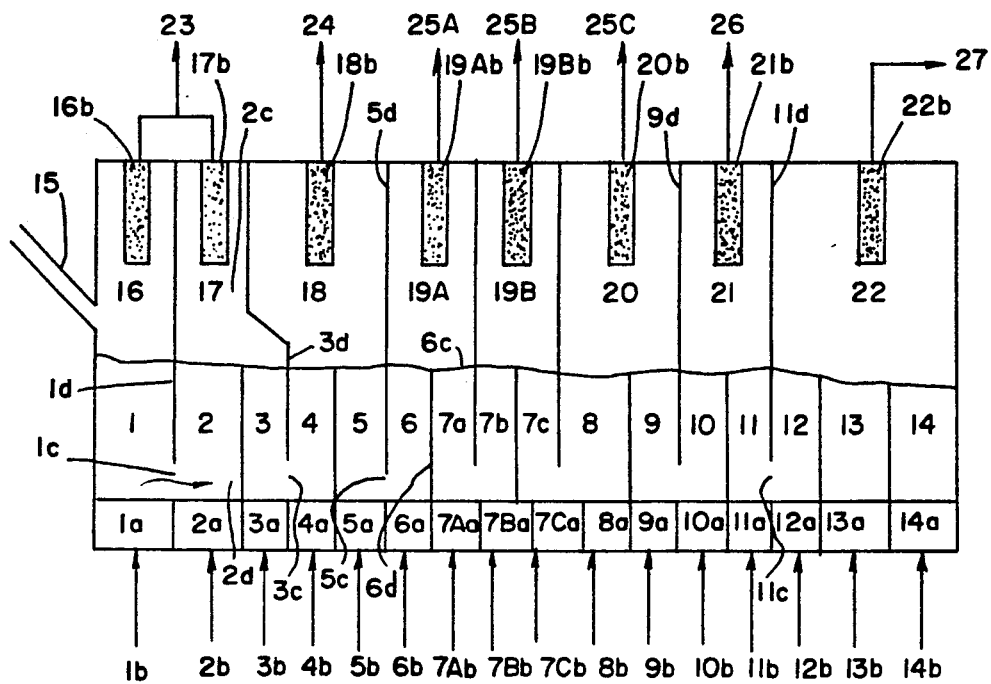
FIG. 1 is a schematic elevation of a preferred example of a multichamber type fluid bed reaction apparatus of the present invention in which uranium oxide is converted to $UF_6$.
FIG. 2 is a schematic elevation of the conventional multi-tower type apparatus corresponding to the apparatus of FIG. 1.

In FIG. 1, chambers 1-14 constitute a multichamber type fluid bed part (in some cases, a part thereof may be a moving bed or a fixed bed), 1a-14a are wind box parts for supplying fluidizing gas respectively corresponding to the chambers 1-14, and 1b-14b are nozzles for supplying a fluidizing gas to chambers 1-14. Of chambers 1-14, chambers 1-2 provide the function of reducing $U_3O_8$ or $UO_3$ to $UO_2$ and chambers 3-6 provide the function of cooling and storing particles, gas-sealing, and regulating transfer of particles. Chambers 7-8 provide the function of converting $UO_2$ to $UF_4$, and chambers 9-12 have the function of cooling and storing particles, gas-sealing and regulating transfer of particles, respectively. Chambers 13-14 provide the function of converting $UF_4$ to $UF_6$. The raw material $U_3O_8$ or $UO_3$ is supplied through a raw material supplying pipe 15 to chamber 1 where $U_3O_8$ or $UO_3$ is reduced to $UO_2$ with hydrogen gas contained in the fluidizing gas supplied through nozzle 1b and wind box 1a. In chamber 1, as $UO_2$ particles forming the fluid bed increases the height of the bed according to the supplied amount of uranium compound raw material, the particles transfer from chamber 1 to chamber 2 mainly through the lower gap 1c of the partition wall 1d under the pressure of the bed.

In chamber 2, remaining $U_3O_8$ or $UO_3$ in the unreacted state in chamber 1 is almost completely converted to $UO_2$ with hydrogen gas from wind box 2a and nozzle 2b. Particles spill over the top 2c of the partition 2d. The hydrogen gas for reduction is contained in the fluidizing gas supplied through wind box 3a and nozzle 3b. Partition 3d turns out hydrogen gas remaining among $UO_2$ particles and at the same time prevents the hydrogen gas from entering the following chamber with gas-seal because of the partition 3d. Particles flow through gap 3c into chamber 4. Chamber 4 and chamber 5 provide the function of cooling and storing the particles, and nitrogen gas is supplied through nozzles 4B and 5B, wind box 4a and wind box 5a, respectively. In chamber 4, a fluid bed is used, and in chamber 5, a fluid bed or moving bed is used. Chamber 5 and chamber 6 also provide the function of regulating the transfer of particles. Regulation of transfer amount of particles is carried out by controlling the amount of the gas supplied to chamber 5 and chamber 6.

By regulating the amount of nitrogen gas supplied to chamber 6, the height of the fluid bed in chamber 6 changes, and the amount of particles which overflow the top 6c of partition 6d to chamber 7A changes. The amount of particles moving through gap 5c below partition 5d from chamber 5 to chamber 6 is determined by the relation between the height of the bed in chamber 5, the amount of nitrogen gas supplied to chamber 5 and the amount of nitrogen gas supplied to chamber 6. Further, when the amount of nitrogen gas supplied to chamber 6 is made to decrease under a limiting amount of flow (velocity at incipient fluidization), the fluidization is stopped to form a fixed bed in chamber 6 and the transfer of particles to chamber 7A is stopped. Consequently, chamber 5 and chamber 6 are made to provide the function of storing particles, and chamber 6 provides the function of gas-sealing. As in the chamber 7, HF gas is used; nitrogen gas supplied to chamber 6 prevents the HF gas from entering the neighboring chambers. In chambers 7A, 7B, 7C and chamber 8, $UO_2$ is converted to $UF_4$ with HF gas. HF gas is supplied as a part of fluidizing gas through 7Ab, 7Aa and 8b and 8a. Completion of the reaction of $UO_2$ to $UF_4$ is somewhat slow and delicate supervision of the operating conditions is required. It is known that according to the reaction of the initial stage and that of the later stage, change of the reaction conditions is effective to adjust efficiently the progress of the reaction. From this point, in this reaction region, the fluid bed part is designed to be multistage to change the operating condition in each stage in turn. The chamber is divided into 7A, 7B, 7C and 8 so that the temperature of each chamber, composition of the supplied HF gas may be selected arbitrarily. Chamber 9–chamber 12 provide a function similar to that of chamber 3–chamber 6. In chamber 9 HF gas remaining among the particles is driven out and is prevented from entering chamber 10 by gas-sealing. Chamber 10 and chamber 11 provide the function of cooling and storing of the particles and at the same time that of regulating the transfer of the particles. Chamber 12 along with partition 11d provides the function of gas sealing opposed to HF gas used in chamber 13 or chamber 14 and also that of regulating the transfer of the particles through gap 11c in cooperation with chamber 11. In chamber 11, a fluid bed, moving bed or fixed bed may be used and in chamber 12, a fluid bed or fixed bed may be used.

Chamber 13 and chamber 14 provide the function of converting $UF_4$ to $UF_6$ with $F_2$ gas supplied as a fluidizing gas through 13b, 13a and 14b, 14a. In $UF_6$ conversion processes, increasing the utilization efficiency of expensive $F_2$ gas as high as possible is important, as it is directly linked to lowering the manufacturing cost. For this purpose, it is necessary to control the quantitative relation between $UF_4$ and $F_2$ gas supplied to the reaction chamber. Consequently the function of quantitatively regulating transfer of the particles has an important significance.

In chamber 13 and chamber 14, alumina or $CaF_2$ particles are used as a fluidizing media. $UF_4$ particles supplied to chamber 13 react with $F_2$ gas as the fluidizing media to form $UF_6$, and unreacted $UF_4$ particles enter chamber 14. In chamber 14, the unreacted $UF_4$ particles react again with $F_2$ gas to form $UF_6$, but the unreacted $UF_4$ partly remains here to be returned to chamber 13. Thus, between chamber 13 and chamber 14 $UF_4$ particles circulate with the fluidizing media, and by changing quantitatively $F_2$ gas supplied through 13b and 13a and $F_2$ gas through 14b, 14a, the degree of utilization of $F_2$ gas can be higher than in the case of using a single fluid bed. Chambers 16–22 are gas-particle separation means where the particles accompanied by gas from the fluid bed are separated from the gas. The separation means are divided by kinds of particle and gas, and each divided separation part is fitted with a gas-particle separating filter, 16b, respectively. Gas-particle separation means 16 and 17 have a common waste line 23, but in chambers 1 and 2 they are separated to avoid mixing of particles of chambers 1 and 2. Gas-particle separation means 18 is independent because the greater part of the gas is nitrogen gas.

In gas-particle separation means 19A, 19B and 20, the main constituent of gas is HF gas and steam, but owing to difference of the reaction conditions, especially difference of the concentration of HF gas in each chamber, the gas-particle separation means is divided into three parts in which after treatment is made possible respectively. Gas particle separation means 21 is similar to the separation part 18. The gas introduced to gas-particle separation part 22 is a mixed gas of $UF_6$ gas, remaining $F_2$ gas and nitrogen gas. The mixed gas is separated in gas-separation means 22 and sent to a cold trap for recovering $UF_6$ and a clean up reactor line for increasing the degree of utilization of the remaining $F_2$ gas.

Next, the apparatus of the present invention will be explained by comparing its constitution elements with those of the conventional apparatus of FIG. 2. Vessel 30 of FIG. 2 is a fluid bed reaction apparatus which reduces $U_3O_8$ or $UO_3$ to $UO_2$, each of vessels 38 and 41 is a fluid bed reaction apparatus which change $UO_2$ to $UF_4$ and vessel 48 is a fluid bed reaction apparatus which forms $UF_4$ to $UF_6$. Each of vessels 33–36 provides a function of cooling and storing particles, gas-sealing and transferring particles by gas stream. Vessel 37 is an apparatus for supplying a fixed amount of particles. Each of vessels 39 and 40 provide a function of gas-sealing and supplying a fixed amount of particles, and vessels 43–46 provide a function of cooling and storing particles, gas-sealing and transferring particles by gas stream. Vessel 47 is an apparatus for supplying a fixed amount of $UF_4$. Apparatus 30b, 38b, 41a, 48b are solid-gas separation filters for fluid bed reaction apparatus. The correspondence of these constituent elements of the conventional apparatus to those of the apparatus of the present invention is as follows.

Fluid bed reaction apparatus 30 of FIG. 2 corresponds to chamber 1 and 2 of FIG. 1, and vessels 33–37 have the same function as that of chamber 3–chamber 6. Fluid bed reaction apparatus 38 and 41 correspond to chamber 7 and chamber 8, and apparatus 43–47 have the same function as that of chamber 9 to chamber 12. Fluid bed reaction apparatus 48 corresponds to chamber 13 and chamber 14. As for solid-gas separation filter, 30b corresponds to 16b and 17b, 35b to 18b, 38b to 19Ab and 19Bb, 41a to 20b, 45b to 21b 48b to 22, respectively. The conventional fluid bed reaction apparatus are all cylinder type. In FIG. 2, $U_3O_8$ or $UO_3$ supplied by supplying pipe 31 is reacted with $H_2$ gas supplied through 32 in the apparatus 30 to $UO_2$. After $UO_2$ formed is received by receiving hopper 33, it is transferred through supplying hopper 34 and is transferred by nitrogen gas stream supplied by 34a through solid-gas separating hopper and reaches supplying hopper 36 for fluid bed reaction apparatus 38. A fixed amount of $UO_2$ supplied by 37 reacts in the apparatus 38 with HF contained in waste gas from reaction 41 to be partly $UF_4$. Successively, the particles are received by receiving hopper 39 and sent by quantitatively supplying device 40 to fluid bed reaction apparatus 41 where unreacted $UO_2$ particles react with HF and $UF_4$. Apparatus 43–47 provide a function similar to that of vessels 33–37 and carry out the supplying of particles to fluid bed reaction apparatus 48. In apparatus 48, $UF_4$ reacts with $F_2$ gas supplied by 49 to $UF_6$, and $UF_6$ is sent to system 48a containing the cold trap for recovering $UF_6$ and for increasing the degree of utilization of remaining $F_2$ gas.

As described above, in the conventional apparatus, as each tower is independent and the transfer of particles therebetween is carried out by drop of power, so the height becomes higher as the arrangement and the occupied area is larger. Consequently, the height and area of building which houses these apparatus becomes higher and larger, so the ventilation capacity peculiar to a nuclear facility increases. For lowering the height, there is a method which transfers particles to a high position by gas stream, but apparatus systems which transfer particles by gas stream become complex and an occupied area becomes larger and further the arrangement and operation becomes complicated. In such background, increasing the number of towers is not the best plan and improvement of a reaction efficiency by multiplicity becomes difficult.

On the other hand, in the apparatus of the present invention, since particles transfer about horizontally, the height of the apparatus can be lower, and no special apparatus is required for transfer of particles. Therefore, the apparatus can be simplified greatly. Multiplying the reaction stages for improving the efficiency of the fluid bed reaction apparatus can be achieved easily by increasing the number of the chambers. Since the operating condition in each chamber can be selected according to known conditions, the reaction efficiency can be improved easily by changing the operating conditions carefully. In the apparatus of the present invention, the multiplication of chambers in the region of converting $UO_2$ to $UF_4$ is a good example of this case.

Further, the apparatus of the present invention is mainly composed of a fluid bed reaction process, but as described above, besides the fluid bed, a moving bed and fixed bed can be easily realized by changing an amount of gas supplied. Consequently for example, the invention has the advantage that it is also applicable instantly to a process for which the improvement of reaction efficiency is expected by combining a fluid bed reaction process and a moving bed reaction process.

For fitting the partition wall in each chamber, there are two methods, that is, a method in which the partition wall is disposed in contact with the bottom surface of the fluid bed and the other method in which the partition wall is disposed with a gap above the bottom of the fluid bed.

Figure 3A:
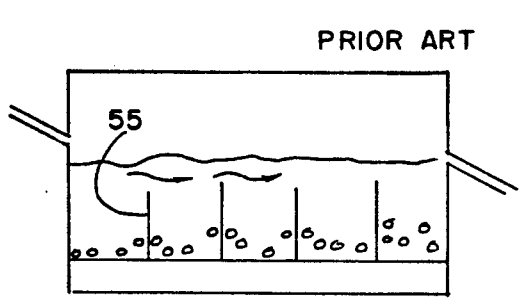
FIG. 3(a) is a schematic elevation of a fluid bed reaction apparatus in which the partition wall is disposed in contact with the bottom surface of the fluid bed.
Figure 3B:
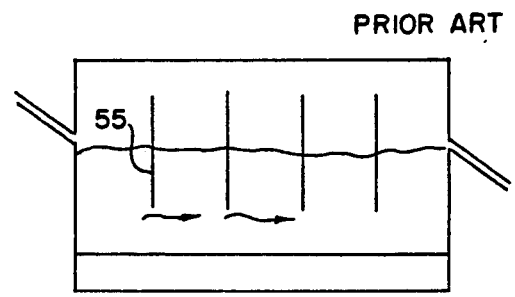
FIG. 3(b) is a schematic elevation of fluid bed reaction apparatus in which the partition wall is disposed with a gap above the bottom level of the fluid bed.
Figure 3C:
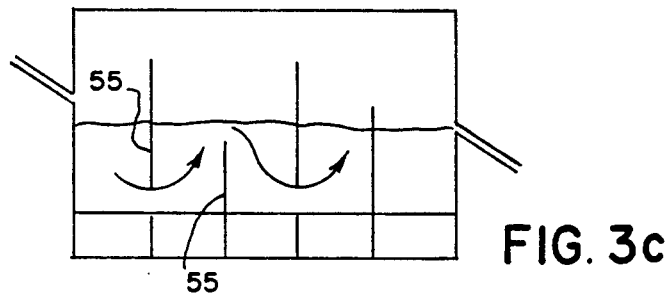
FIG. 3 (c) is a schematic elevation of the fluid bed reaction apparatus of the present invention which combines the partition wall of FIG. 3 (a) and the partition wall of FIG. 3 (b).

In the conventional multichamber type fluid bed reaction apparatus as FIG. 3a and FIG. 3b show, as a partition wall, only one of these two kinds of partition walls is provided. In the system of FIG. 3a in which the partition wall is disposed in contact with the bottom surface of the fluid bed, when coarse particles are mixed in with the other particles, a problem develops in that the coarse particles remain in the bottom of the fluid bed and do not flow over the partition wall, resulting in the formation in the fluid bed of a coarse particle layer. In the system of FIG. 3b in which the partition wall is disposed with a gap above the bottom surface of the fluid bed, no such problem exists as that of FIG. 3a, but the probability of short circuit or intermingling of the particles between the chambers becomes greater which can result in an undesirable reaction. However, by combining both systems as in FIG. 3c, these problems can be avoided and at the same time efficiency of the reaction can be increased as the flow of particles approaches a piston flow. Further, by combining both of these systems, the advantages of a combination of the fluid bed and the moving bed can be achieved which is impossible in the conventional systems. In this example, there is shown a slab shape type fluid bed reaction apparatus as a united body. However, in the case in which kinds of materials used are plural and forming these materials into a united body is difficult or impractical, and the case in which owing to extremely different temperature between the chambers uneven thermal expansion occurs and it is hard to control operating conditions and a united body is difficult, by connecting plural kinds of reaction apparatus these problems can be avoided without changing of the basic concept of the present invention, by connecting plural kinds of reaction apparatus by connecting pipes.

Figure 4:
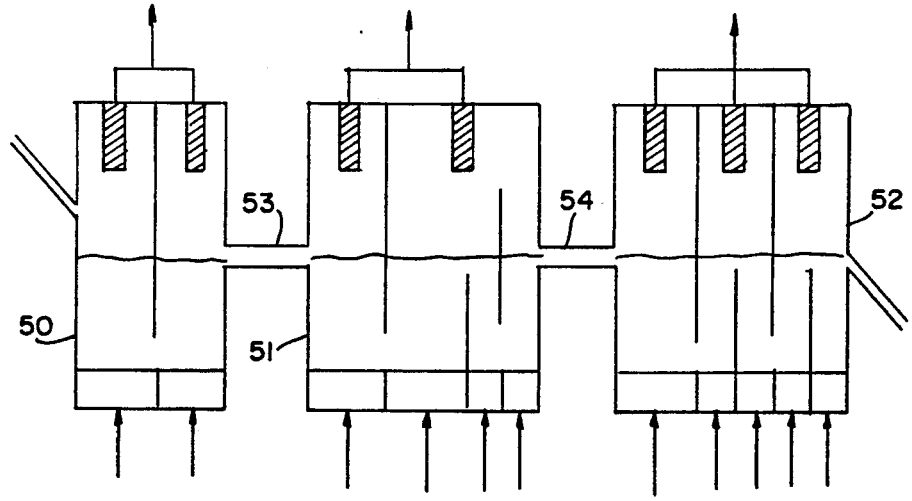
FIG. 4 is a schematic elevation of a different example of the present invention in which a fluid bed reaction apparatus is connected by connecting pipe due to the difficulty of uniting the reaction apparatus into a united system.

FIG. 4 is an example of this case. In FIG. 4, 50–52 are divided reaction apparati, and 53 and 54 are connecting pipes which connect these apparati together and provide a capability of stretching when avoidance of such thermal expansion is required. Moreover, the apparatus of the present invention has the advantage that the degree of freedom in arrangement of the apparatus is extremely high.

FIGS. 5(a), (b), (c), (d) show respectively different arrangements of slab shape type fluid bed reaction apparatus of the present invention. Further, as shown in FIG. 6, by adopting a system which extends a slab shape type fluid bed vertically and horizontally, there can be achieved respectively a series along its horizontal extension and an easily increased treatment capacity of the apparatus by its vertical extension. In the fluid bed reaction apparatus comprising two chambers, when $UF_4$ is converted to $UF_6$, the amount of $F_2$ gas supplied to the two chambers can be respectively regulated. Consequently $F_2$ gas can be utilized with higher efficiency than in a fluid bed reaction apparatus comprising a single chamber.

As shown in FIG. 6, when two or more multichamber type fluidized bed reactors are connected in direct and parallel, the productive capacity of the reactor is increased proportionally.

As shown in FIG. 7, when the reactor is divided crosswise by partition walls, solid particles are able to circulate and recycle.

What is claimed is:

1. A method for operating a multi-chamber fluid-bed reactor having plural reaction zones, for converting $U_3O_8$ or $UO_3$ to $UF_6$, said method comprising the steps of:
    (a) providing a unitary multi-chamber fluidized bed reactor comprising a series of fluidization chambers horizontally disposed and defined in a single housing, said series of fluidization chambers defining in series a first reaction zone, a first intermediate zone, a second reaction zone, a second intermediate zone and a third reaction zone; each of said reaction and intermediate zones having a respective gas recovery pipe attached to said housing, and wherein each reaction zone is defined by a plurality of chambers,
    (b) introducing particles of said $U_3O_8$ or $UO_3$ to an inlet of said first reaction zone,
    (c) introducing hydrogen as a reactant gas into a fluidization gas inlet of said first reaction zone to fluidize said particles of $U_3O_8$ or $UO_3$ and to convert them to particles of $UO_2$,
    (d) conveying said particles of $UO_2$ in a horizontal direction to said second reaction zone through said first intermediate zone receiving an inert gas through a fluidization gas inlet to maintain said particles of $UO_2$ in a fluidized condition,
    (e) introducing hydrogen fluoride as a reactant gas into a fluidization gas inlet of said second reaction zone to fluidize said particles of $UO_2$ and to convert them to particles of $UF_4$,
    (f) conveying said particles of $UF_4$ in a horizontal direction to said third reaction zone through said second intermediate zone receiving an inert carrier gas through a fluidization gas inlet to maintain said particles of $UF_4$ in a fluidized condition,
    (g) introducing fluorine as a reactant gas into a fluidization gas inlet of said third reaction zone to fluidize said particles of $UF_4$ and to convert them to gaseous $UF_6$, thus converting $U_3O_8$ or $UO_3$ to gaseous $UF_6$,
    thereby completing the process of operating the multichamber fluid bed reactor for converting particles of $U_3O_8$ or $UO_3$ to gaseous $UF_6$ wherein each of said gaseous reactants is recovered separately by each of plural gas recovering pipe means attached to the reactor.

2. The method of claim 1 in which each of said chambers are separated by partitions to form the reaction and the intermediate zones, wherein at least one of said partitions extends from the bottom of each of said chambers and at least one other of said partitions is located above the bottom level of the fluid bed in each of said chambers to produce a flow of particles therethrough.

* * * * *